(12) United States Patent
Terada

(10) Patent No.: US 6,367,367 B1
(45) Date of Patent: Apr. 9, 2002

(54) BRAKE CYLINDER DEVICE

(75) Inventor: Hiroyuki Terada, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/633,622

(22) Filed: Aug. 7, 2000

(30) Foreign Application Priority Data

Aug. 6, 1999 (JP) .......................................... 11-224428

(51) Int. Cl.$^7$ .............................................. F16D 65/38
(52) U.S. Cl. ..................... 92/13.6; 92/13.1; 188/196 D; 188/79.56
(58) Field of Search .................. 92/13.6, 13.1; 188/196 D, 79.56, 79.62

(56) References Cited

U.S. PATENT DOCUMENTS

| 3,811,538 A | * | 5/1974 | Farr .................... 188/196 D X |
| 4,702,354 A | | 10/1987 | Ingram et al. |
| 5,713,437 A | * | 2/1998 | Furukawa et al. .......... 188/352 |
| 5,996,744 A | * | 12/1999 | Niki et al. .......... 188/196 D X |

FOREIGN PATENT DOCUMENTS

| GB | 1446552 | 8/1976 |
| GB | 2116269 | 9/1983 |
| JP | 1113797 | 1/1997 |
| JP | 9229114 | 9/1997 |
| JP | 9229115 | 9/1997 |
| JP | 9317801 | 12/1997 |

\* cited by examiner

Primary Examiner—Kevin Lee
(74) Attorney, Agent, or Firm—Liniak, Berenato, Longacre & White

(57) ABSTRACT

A brake cylinder device with a built-in automatic shoe clearance adjustment device which prevents a chance of misassembly, loosing, or omitting the spacer. The brake cylinder device includes an adjustment bolt screwed into a pair of pistons symmetrically slidably positioned inside a cylinder body. A locator spring is positioned between both adjustment bolts. A locator is positioned at the end of the locator spring, and a spacer engages the top end of the locator and has a supporting portion to support the top end on the axis of the adjustment bolt. The supporting portion of the spacer has the front and back surfaces of the same shape.

12 Claims, 12 Drawing Sheets

F I G. 5
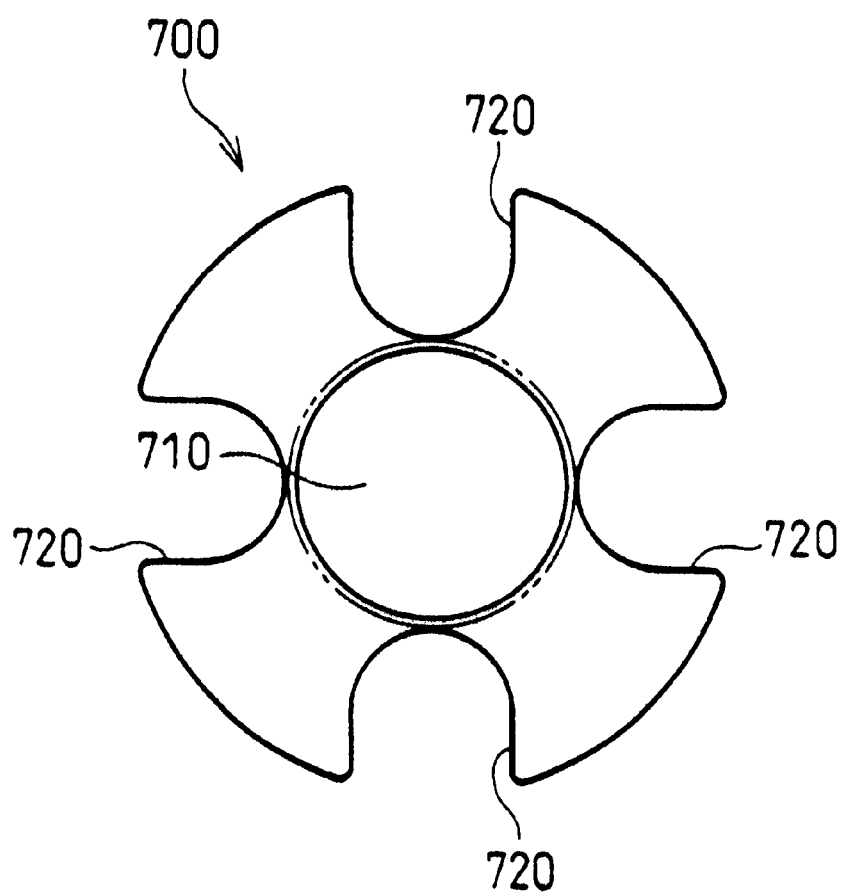

BRAKE CYLINDER DEVICE

BACKGROUND OF THE INVENTION

1. Field of the Invention

The invention relates to a brake cylinder device with a built-in automatic shoe clearance adjustment mechanism.

2. Summary of the Related Art

FIG. 12 shows a conventional brake cylinder device with a built-in automatic shoe clearance adjustment mechanism. This conventional hydraulically actuating cylinder, positioned between adjacent facing ends of brake shoes, functions to automatically adjust clearances between a brake drum and the brake shoes in addition to its function to separate the brake shoes apart and to restrict the returning positions of the brake shoes.

This brake cylinder device is designed to be bilaterally symmetrical except for some parts such as a locator 380 in the central portion; therefore, an arrangement of the device at the right half is mainly explained here. A cylinder body 100 has a large diameter bore 110 with a bottom, a partition 130 having a small diameter bore 120 which is coaxial to the large diameter bore 110, formed to be a fluid flow passage between opposed large diameter bores 110, 110 of the brake cylinder device via the small diameter bore 120. An adjustment gear 210 is formed at the periphery on the right end of a piston 200 stroking out from the large diameter bore 110, on which a piston head 220 is concentrically fit with a capacity to make a relative rotation. A notched groove 221 is formed at the right part of the piston head 220 to receive a shoe web of the brake shoe, not shown in FIG. 12.

An adjustment bolt 300 is engaged in non-reversible screw threaded connection with an internal thread of a coaxial blind-end hole of the piston 200. Here, "non-reversible screw threaded connection" means a screw threaded connection that does not cause relative rotation between the two members if a thrust force in the axial direction is transmitted on either one of the piston 200 or the adjustment bolt 300. A first clutch face 310 in a conical shape formed at the left end of the adjustment bolt 300 makes a clutch engagement with a corresponding clutch face formed at the halfway of the small diameter bore 120 in the partition 130.

A drive ring 320, the outer peripheral surface of which is beveled to provide a clutch face into engagement with a corresponding internal clutch face formed on a projection of the partition 130 at the entrance of the small diameter bore 120. Clutch engagements among the adjustment bolt 300, the drive ring 320, and the corresponding clutch faces of the cylinder body 100 are to be in conical shape in order to obtain a more stable rotational resistance than that of the clutch engagements with flat surfaces. The internal circumference of the drive ring 320 is provided with a fast thread, which is in mesh with a corresponding external thread 330 at the left side of the adjustment bolt 300 in a manner of reversible screw threaded connection with a slight gap (backlash hereinafter). Here, "reversible screw threaded connection" means a screw threaded connection that does cause relative rotation between the two members when a thrust force in the axial direction is applied on either one of the piston 200 or the adjustment bolt 300. An adjustment spring 340 provided between the adjustment bolt 300 and the drive ring 320 constantly urges the drive ring 320 in the direction to be into clutch engagement with the corresponding internal clutch face of the cylinder body 100 by its spring force.

A through hole 350 with a shaped large diameter bore 360 is formed inside the adjustment bolt 300 extending in its axial direction. The large diameter bore 360 is formed at the left part of the through hole 350 via a stepped surface 351, and there is a locator spring 370 positioned between facing two large diameter bores 360, 360 of the adjustment bolts 300, 300. This locator spring 370 is to prevent free movement due to vibration caused while in braking operation by acting an urging force to the adjustment bolts 300, 300. Moreover, the locator 380 and a spacer 390 are positioned between the right end of the locator spring 370 and the stepped surface 351, so that a torsion force of the locator spring 370 does not affect on both adjustment bolts 300, 300. Further, only the spacer 390 is positioned between the left end of the locator spring 370 and the stepped surface 351. The reference number 400 is a piston cup defining a hydraulic chamber 140, 410 is a backup ring, 420 is a dust boot sealing the large diameter bore 110, and 430 is an O-ring supporting the end of the adjustment bolt 300 in the side of the clutch face.

While in braking operation, upon pressurizing the hydraulic chamber 140 located at the bottom of the small diameter bore 120; the piston 200 moves the brake shoe outwardly into lining contact with the brake drum ultimately causing a braking effect. (It is noted that the shoe, lining, and drum are not shown in FIG. 12. These components are known to those of ordinary skill in the art and no further explanation is warranted.)

The operation of the automatic shoe clearance adjustment mechanism is explained hereunder. While in braking operation, the adjustment bolt 300 moves together with the piston 200 outwardly. Now, if the lining wears out and an amount of outward movement of the adjustment bolt 300 takes up and exceeds the backlash between the drive ring 320 and the adjustment bolt 300, the drive ring 320 is urged out of engagement with the corresponding clutch face and smoothly rotates.

When the brake is released and the adjacent brake shoe is retracted by the shoe return spring, (not shown in FIG. 12), the piston 200 and the adjustment bolt 300 return to the amount of the backlush, the drive ring 320 is urged once again strongly into clutching engagement disabling the rotation thereof, and the adjustment bolt 300 is thereafter caused to be rotated until the clutch face 310 at the left end of the adjustment bolt 300 comes into the clutch engagement and screwed out from the piston 200. Accordingly, the retracted position of the piston 200 may be set in response to the amount of the lining wear.

As is evident from the above-described operation of the automatic shoe clearance adjustment, the locator spring 370 positioned between the facing large diameter bores 360, 360 of the pair of adjustment bolts 300, 300 is constantly urging the adjustment bolts 300, 300 in the axial direction in order to prevent the free movement due to vibration caused while in braking operation. However, because the torsion force of the locator spring 370 acting on the adjustment bolt 300 may result in unstable automatic shoe clearance adjustment operation, a conventional device provides the locator 380 and the spacer 390 between one end of the locator spring 370 and the stepped surface 351. Here, the conventional device has the following points to be improved.

In order to act the force of the locator spring 370 to the axis center of the adjustment bolt 300, the spacer 390 with a concave portion guiding the top of the locator 380 into the axis of the adjustment bolt 300 is used. However, this concave portion is provided only at one surface of the spacer 390, there is a possibility of misassembling the spacer 390 into the large diameter bore 360 of the adjustment bolt 300.

The piston cup 400, the dust boot 420, and the O-ring 430 used in the cylinder device are rubber or elastomeric members and need to be replaced periodically. Accordingly, there is a possibility of loosing the members or omitting a particular member during assembly and reassembly in addition to the above-described misassembly of the spacer 390 during reassembly.

This invention is made to improve the above-described points and is to provide a brake cylinder device with a built-in automatic shoe clearance adjustment mechanism enable to eliminate the possibility of loosing the members, omitting the particular member, and misassembling.

BRIEF SUMMARY OF THE INVENTION

The present invention is directed to a brake cylinder device with a built-in automatic shoe clearance adjustment mechanism. The device includes a pair of opposing pistons slidably fit in a cylinder bore of a cylinder body and a pair of adjustment bolts having a coaxial through hole. One end of each adjustment bolt is screwed into the piston with a non-reversible screw thread connection. The other end of each adjustment bolt is urged into clutching engagement with the cylinder body. A pair of drive rings, internally threadingly engage the other side of the adjustment bolt in a reversible screw thread connection with a backlash in the axial direction. The peripheral surface of the drive ring is urged by an adjustment spring into clutching engagement with a partition of the cylinder body. The pistons, adjustment bolts, adjustment springs, and drive rings are provided oppositely and symmetrically in the cylinder bore. A locator spring is positioned between two facing adjustment bolts. A locator is placed in the vicinity of the end of the locator spring. A spacer is placed between the top end of the locator and one of the adjustment bolts, having a supporting portion which engages with and supports the top end of the locator along the axis of the adjustment bolt. A fluid flow passage penetrates through the spacer, wherein the supporting portions formed on the axial center of the spacer are identically shaped both on the front and back surfaces thereof.

The top end of the locator has a conical shaped portion (convex shape) and the supporting portion of the spacer has a tapered concave portion. The spacer supports the top end of the locator and the conical shaped portion is disposed within and engages the tapered concave portion of the space. An angle of the tapered concave portion is designed to be larger than an angle of the conical shape top end of the locator to define a point contact between the conical shaped top end and the tapered concave portion.

The locators are preferably positioned one each adjacent side of the locator spring and the spacers are disposed between the top end of both locators and an associated adjustment bolt. The spacer is preferably symmetrically formed to have front and back surfaces of the same shape. The spacer is integrally pressed in the through hole of the adjustment bolt and is substantially integrated therewith. The outer circumferential diameter on the back and front surfaces of the spacer is preferably designed to be smaller than an inner diameter of the through hole of adjustment bolt. The locator is urged by the locator spring such that the top end of the locator and the supporting portion of the spacer are aligned with the axis of the adjustment bolt.

BRIEF DESCRIPTION OF THE DRAWING FIGURES

FIG. 5 is a plan view of the spacer;

DETAILED DESCRIPTION OF THE PREFERRED EMBODIMENTS

Figure 12:
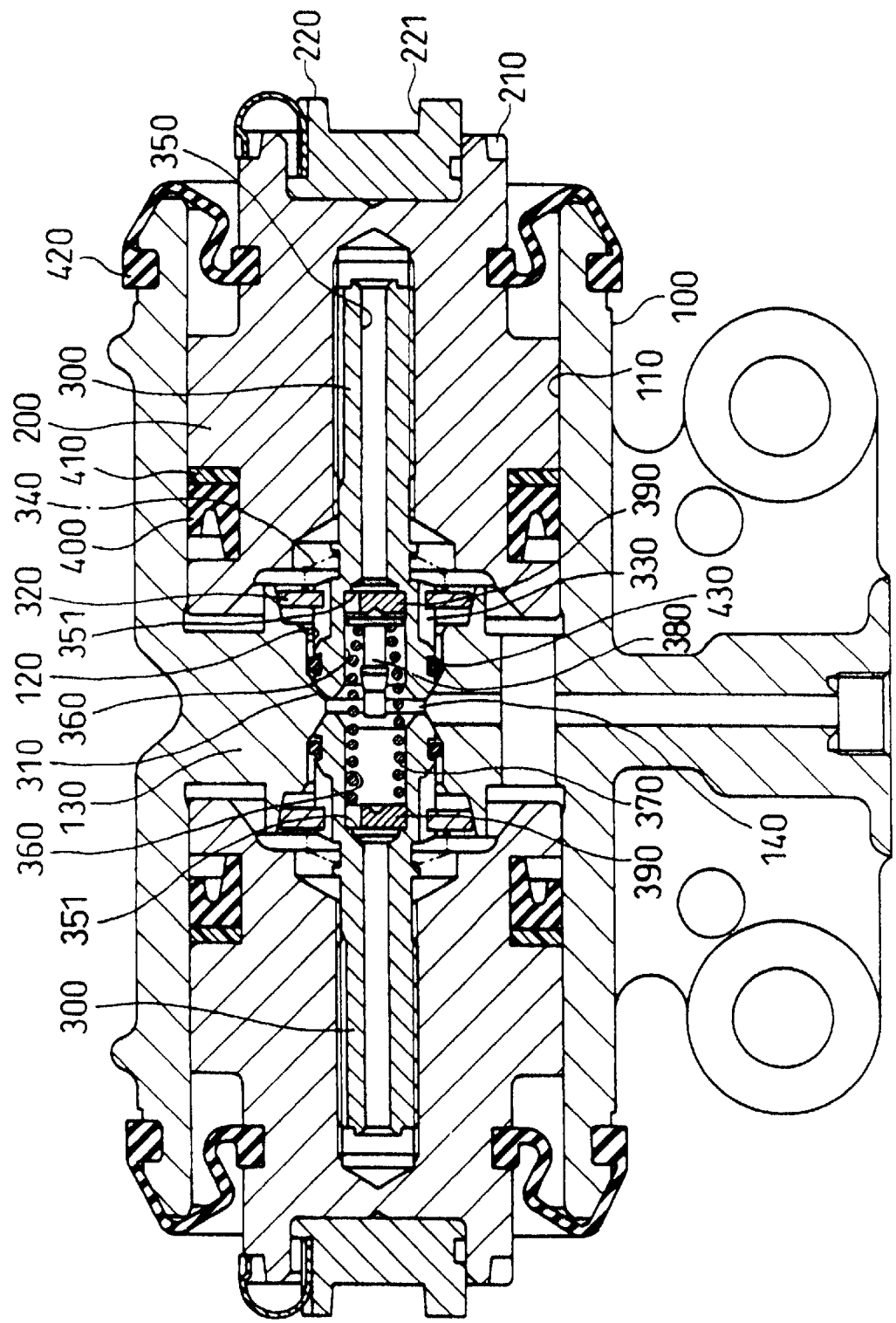
FIG. 12 is a sectional view of the prior art.

One embodiment of the invention is explained with reference to the figures. The brake cylinder device of the present invention includes many corresponding components as shown in the conventional art of FIG. 12 and are identified with the same reference numerals for the sake of brevity and avoiding redundant explanation of the common components previously described.

Figure 1:
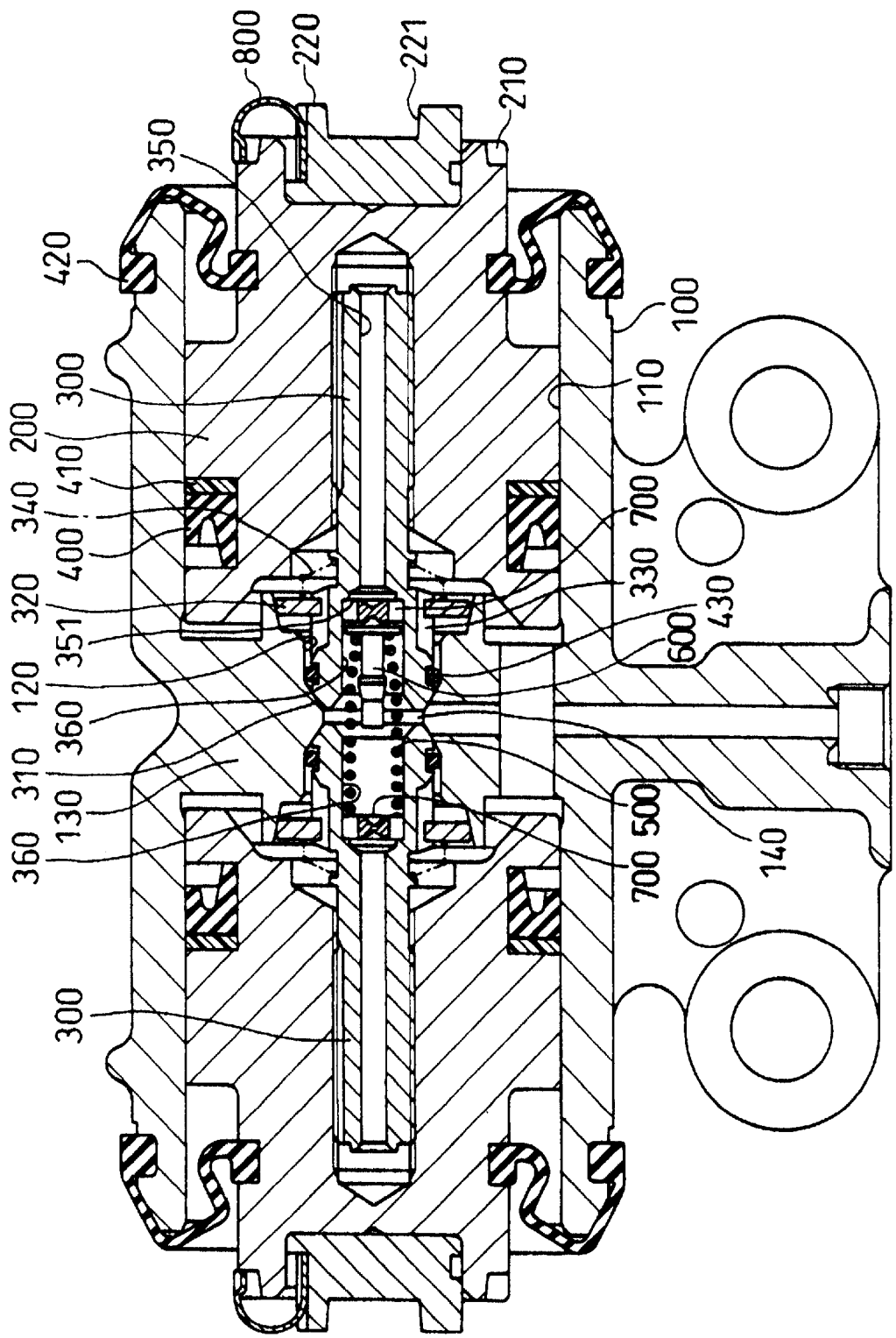
FIG. 1 is a sectional view of the brake cylinder device according to the present invention.

As shown in FIG. 1, a locator spring 500 is positioned between the facing large diameter bores 360, 360 on the axis of both adjustment bolts 300, 300, which gives an urging force on the axis of the adjustment bolts 300, 300 in order to prevent the free movement of the adjustment bolts 300, 300 due to vibration caused during the braking operation. The locator spring 500 is of a taper-like compression coil spring. The locator spring 500 has two turns parallel the right end and the outside diameter of one turn adjacent the left end is slightly smaller than the large diameter bore 360. Here, a substantial part of the locator spring 500 is disposed in the large diameter bores 360, 360 of both adjustment bolts 300, 300, which minimize the entire length of the cylinder device.

Figure 3:
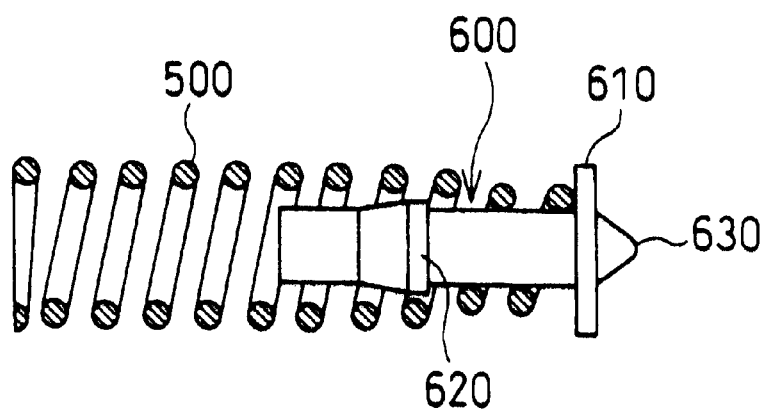
FIG. 3 is a partial sectional view of the locator spring integrated with the locator at one end of the locator spring.

As shown in FIGS. 1 and 3, the locator spring 500 has a locator 600 at one end. The parallel turns at one end of the locator spring 500 are pressed to be installed between a large diameter flange 610 and a small diameter flange 620, both projecting from the locator 600. In addition, the locator spring 500 and the locator 600 are desirably integrated for convenient handling. Further, the top end of the locator 600 has a projected conical shaped abutment (convex portion) 630.

Figure 2:
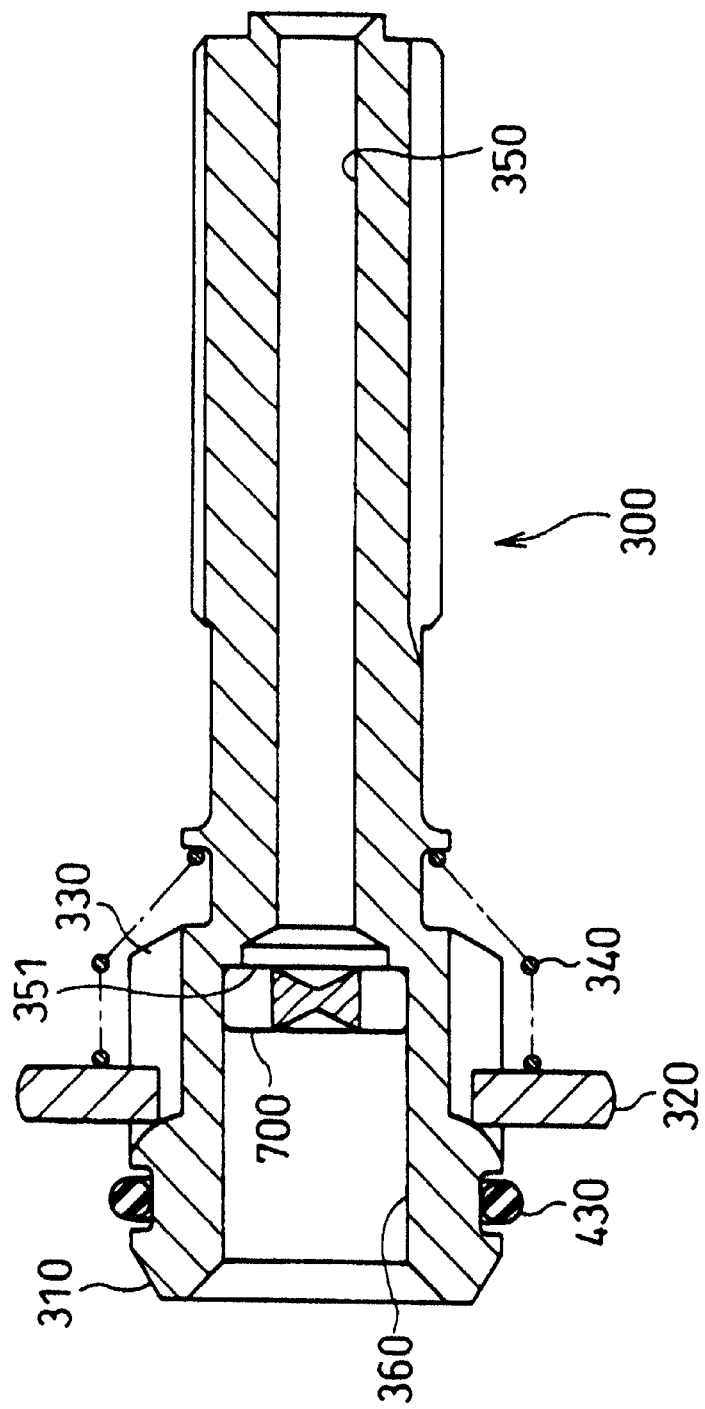
FIG. 2 is a sectional view of the adjustment bolt assembly.

Referring to FIGS. 1 and 2, the spacer 700 positioned between the stepped surface 351 of the adjustment bolt 300 and the locator 600 may be provided only in one large diameter bore 360 considering the automatic shoe clearance function. However, the spacer 700 should be provided in both large diameter bores 360, 360 of the facing adjustment bolts 300, 300 in terms of avoiding the possibility of misassembly.

Figure 6:
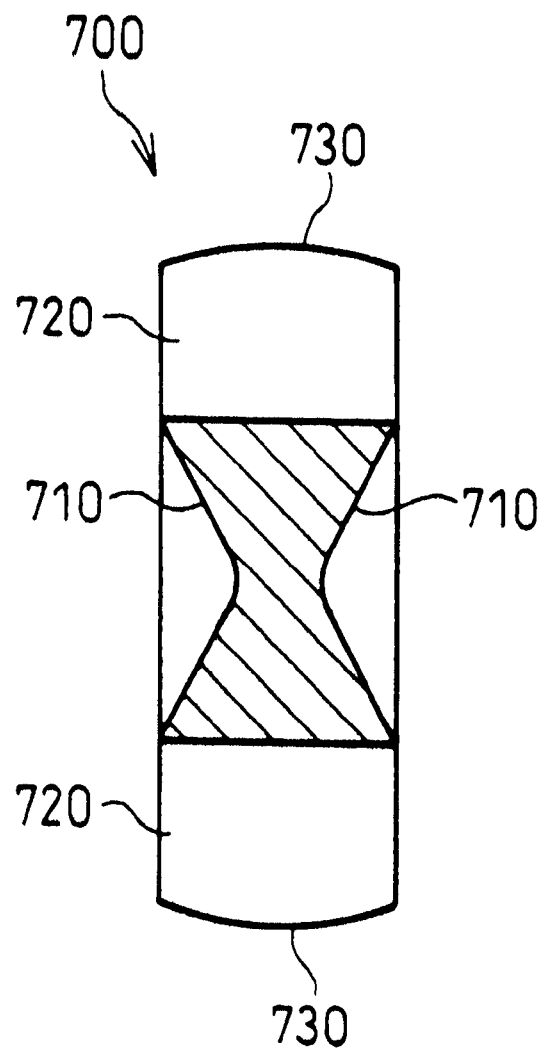
FIG. 6 is a longitudinal sectional view of the spacer in FIG. 5 with a curved peripheral surface.
Figure 7:
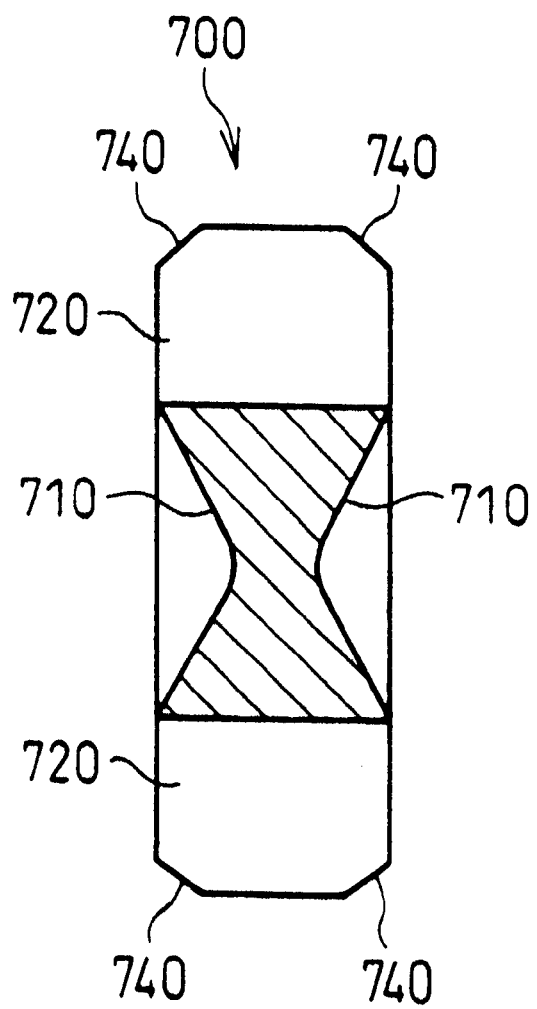
FIG. 7 is a longitudinal sectional view of the spacer in FIG. 5 with a chamfered circumference.

As shown in FIGS. 5–7, the spacer 700 has conical supporting portions (tapered concave portions) 710, 710 at its center of the front and back surfaces thereof, where the top end of the abutment (convex portion) 630 of the locator 600 is supported on the axis of the adjustment bolt 300, and has a plurality of fluid flow passages 720 around an outer periphery thereof to permit the fluid passing through.

Accordingly, if the supporting portions, i.e., the concave portions 710, 710, are provided at the center on the front and back surfaces of the spacer 700, there is no need to be concerned about the side of the spacer 700 during assembly. In addition, the passage 720 is at least, but not limited to, a shape capable of fluid flow between the hydraulic chamber 140 and the through hole 350 passing through the adjustment bolt 300 for the improvement of air bleeding.

Providing the locator 600 and the spacer 700 in the above described manner, the spring force of the locator spring 500 acts on the axial center of the adjustment bolt 300. Thus, no biased load is generated on the adjustment bolt 300, and the torsion force by the locator spring 500 affecting the adjustment bolt 300 is prevented, thereby enabling a stable automatic shoe clearance adjustment operation.

Furthermore, during assembly, the spring force of the locator spring 500 causes the top end of the abutment (convex portion) 630 to slide along the supporting portion (concave portion) 710 of the spacer 700 to automatically adjust its position on the axis of the adjustment bolt 300 so that the top end of the abutment (convex portion) 630 of the locator 600 does not deviate from the axis of the adjustment bolt 300. To that end, the outside diameter of the locator spring 500 relative to the inside diameter of the large diameter bore 360 of the adjustment bolt 300, the outside diameter of the large diameter flange 610 of the locator 600, or the size and shape, of the supporting portion (concave portion) 710 of the spacer 700 may be appropriately selected.

Figure 4:
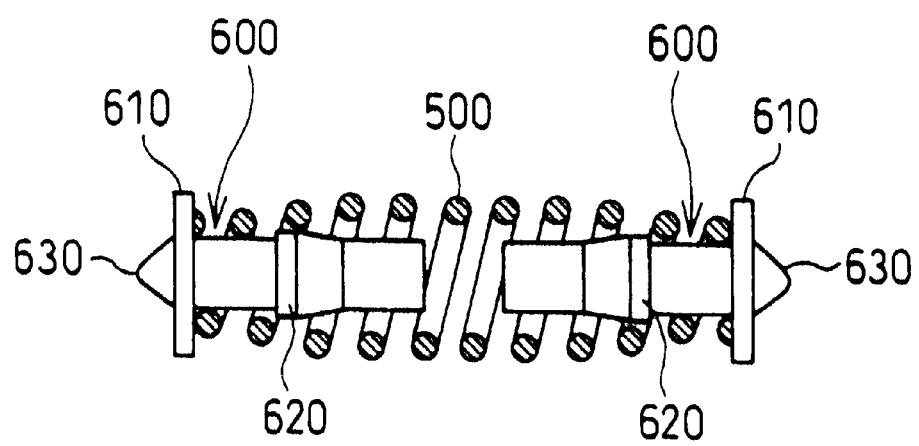
FIG. 4 is a partial sectional view of the locator spring integrated with the locator at both ends of locator spring.

In addition, FIG. 1 shows a case when the spacers 700, 700 are positioned on the right and left side of the device while the locator 600 is positioned only at one end of the locator spring 500. However, the positions of the locator 600 and the locator spring 500 as appear in FIG. 1 may be reversed without detracting from their respective functions. Here, these members are bilaterally non-symmetrical, which increases a possibility for the operator to misassemble the members. However, if the spacers 700, 700 are provided at both sides, the locators 600, 600 may also be provided at both sides of the locator spring 500 to maintain bilateral symmetry as shown in FIG. 4. Such an arrangement completely eliminates a possibility for misassembly. In such case, the locator spring 500 is in the form of a barrel shape.

The top end of the abutment (convex portion) 630 of the locator 600 is angled to be smaller than the angle of the concave portion 710 of the spacer 700 so that a convex-concave engagement between the two members creates a point contact. This eliminates the necessity of using a low friction material or coating the locator 600 and the spacer 700, which reduces the manufacturing cost.

In addition, as is evident from the above explanation, the spacer 700 functions to act the force by the locator spring 500 on the axis of the adjustment bolt 300 and to permit the fluid flow between the hydraulic chamber 140 and the through hole 350. Therefore, although it is not necessary for the front and back surfaces of the spacer 700 to have the same size and shape as shown in FIGS. 5–7, having the same size and shape enables a common design thus facilitating manufacture and reducing the cost. The spacer 700 may be integrally processed by sintered alloy steel, aluminum diecast, or heat resistant thermoplastic resin, thereby further facilitating the manufacture and reducing costs.

Also, as a means to position the spacer 700, the peripheral surface of the spacer 700 may be pressed in the inner circumferential surface of the large diameter bore 360 in the adjustment bolt 300 so as to facilitate the handling of the members and eliminate a problem of omitting the particular member. In this case, however, the diameter of circumference of the spacer 700 is designed (specified) to be smaller than the inside diameter of the large diameter bore 360 of the adjustment bolt 300 to avoid causing a scratch at the circumference of the front and back surfaces thereof when the spacer 700 is pressed in. For example as shown in FIG. 6, the intermediate portion of the peripheral surface of the spacer 700 may be projected to form a curved portion 730 which is pressed to engage the inner circumferential surface of the large diameter bore 360, where the circumferences of the front and back surfaces do not contact the large diameter bore 360. In addition, as shown in FIG. 7, chamfers 740 may be employed instead of the above described curved structure.

Figure 8:
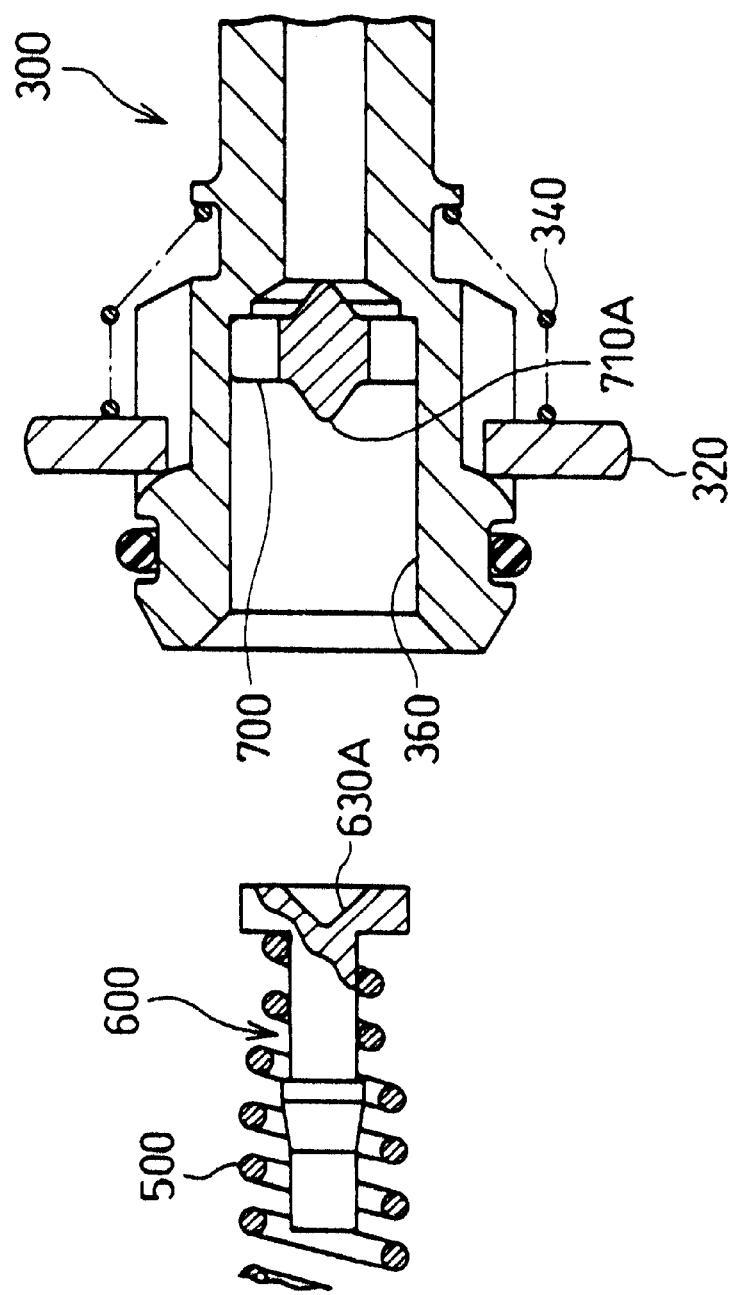
FIG. 8 is a partial sectional view of another locator and spacer according to an alternate embodiment of the present invention.
Figure 9:
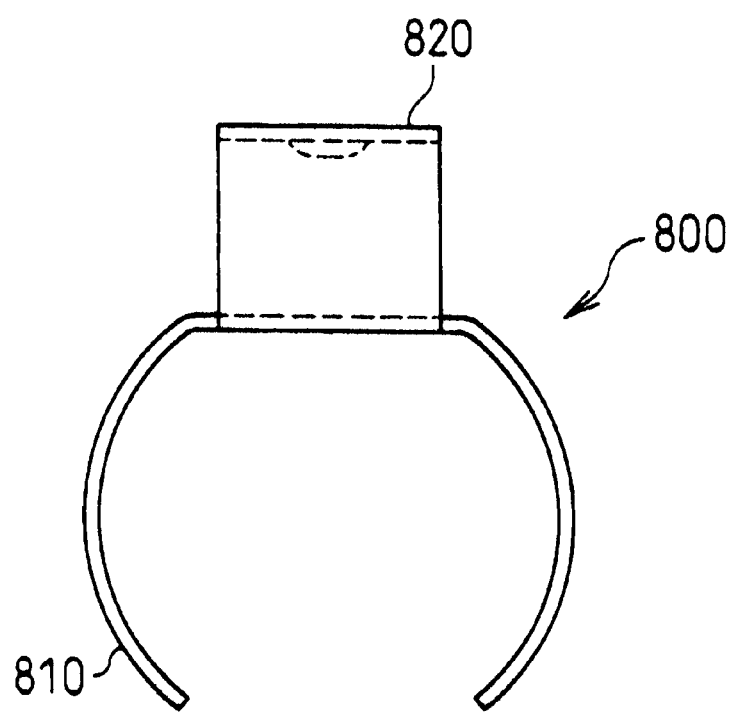
FIG. 9 is a plan view of the clip of the piston head.
Figure 10:
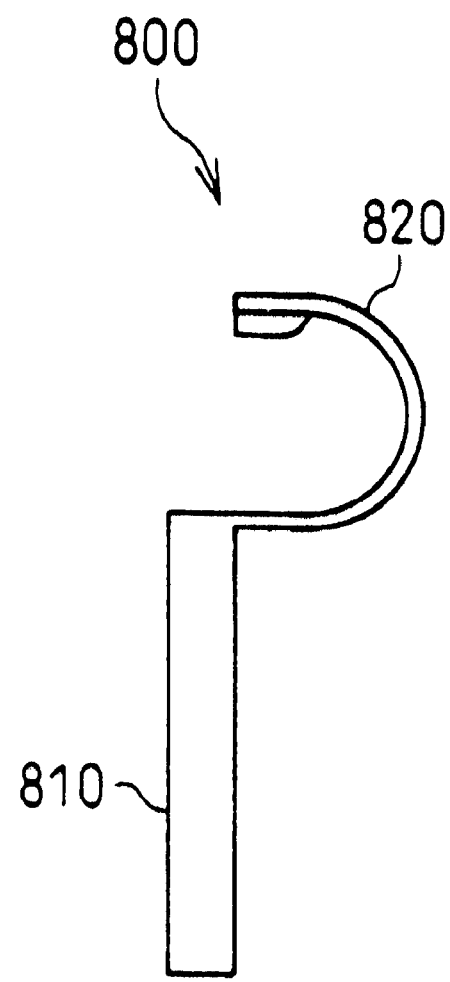
FIG. 10 is a left side view of the clip of FIG. 9.
Figure 11:
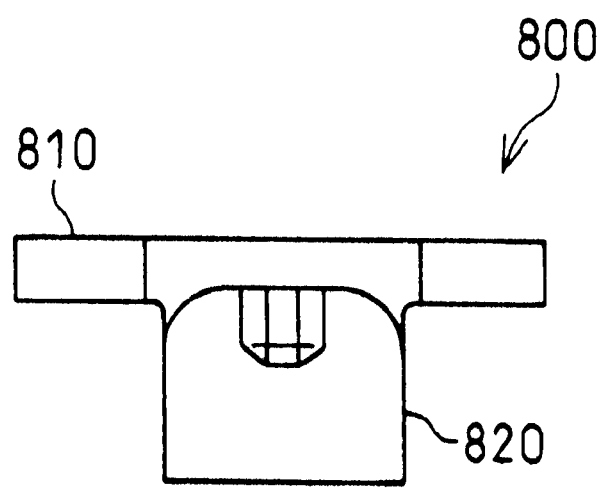
FIG. 11 is a top view of the clip of FIG. 9.

Here, the above-described embodiment of this invention explains about an example where the locator 600 has the conical shaped abutment (convex portion) 630 and the spacer 700 has the concave portion 710. However, as shown in FIG. 8, the concave portion 630A may be formed at the top end of the locator 600, and the conical shaped abutment (convex portion) 710A may be formed at the supporting portion of the spacer 700 to obtain the same effective result.

A piston clip 800, as shown in FIG. 1 and FIGS. 9–11, comprises an attachment section 810 clamping the peripheral surface of a piston head 220 for its installment and an engagement section 820 engaging with the adjustment gear 210 at the front end of the piston 200. The attachment section 810, has a notched end to give an elastic force, and the engagement section 820 is folded from one side surface to form a reverse-U shape having a protuberance inside an adjacent end end.

The piston clip 800 increases the rotational resistance of the piston 200 in order to securely prevent the rotation of the piston 200 due to vibration and make the piston 200 substantially integrated with the piston head 220. Further, when the adjustment gear 210 of the piston 200 is rotated to be adjusted by a tool from outside of the brake. The piston clip 800 has a function to allow for manual adjustment by considering if the U-shaped piston clip 800 is twisted to give a feeling of rotating over the pitch or to give a hammering (impact) noise due to the springing force.

The above-structure of this invention provides the following advantages.

Designing the front and back surfaces of the spacer to have the same shape enables to give common members, thereby facilitating the manufacture and preventing the misassembly.

The spacer may be integrally processed which also facilitates the manufacture.

The spacer may be pressed in the bore of the adjustment bolt to be substantially integrated with the adjustment bolt, which facilitates the handling of the members and eliminates a possibility of omitting the particular member when performing maintenance work.

The outside diameter of the circumferences at the front and back surfaces of the spacer is designed (specified) to be smaller than the inside diameter of the large diameter bore at the part of the through hole of the adjustment bolt to avoid causing a scratch at the circumference of the front and back surfaces when the spacer 700 is pressed in. This arrangement eliminates a chance of contamination by dust due to scratches and prevents biting in the piston cup or the O-ring.

Providing a spacer in a large diameter bore of both adjustment bolts eliminates a chance of misassembling the members. In addition, the spacer and the locator may be positioned at both sides of the locator spring, which also eliminates a chance of misassembly and gives a more stable automatic shoe clearance adjustment operation compared to the case when the locator is positioned only in one of the large diameter holes.

The angle of the concave portion is designed to be larger than that of the conical shaped abutment (convex portion) so that a convex-concave engagement of the locator and the spacer becomes a point contact. This reduces the manufacturing cost and facilitates a stable automatic shoe clearance adjustment operation without having an effect of torsion force by the locator spring on the adjustment bolt.

Integrating the locator spring with the locator positioned in the bore of the adjustment bolt facilitates handling and eliminates the chance of omitting the members when conducting maintenance.

While in assembling, the spring force of the locator spring causes the top end of the locator to slides along the supporting portion of the spacer to automatically align its position on the axial center of the adjustment bolt so that the top end of the locator does not deviate from the axis of the adjustment bolt. Therefore, even an unskilled person may give a urging force of the locator spring on the axis of the adjustment bolt, thereby giving a stable automatic shoe clearance adjustment operation.

While the foregoing invention has been shown and described with reference to a preferred embodiment, it will be understood by those possessing skill in the art that various changes and modifications may be made without departing from the spirit and scope of the invention.

What is claimed is:

1. A brake cylinder device with a built-in automatic shoe clearance adjustment mechanism, said device comprises:

a pair of opposing pistons slidably fit in a cylinder bore of a cylinder body;

a pair of adjustment bolts having a coaxial through hole, each of said adjustment bolts having a first end screwed into a corresponding one of said pistons to form a non-reversible screw thread connection therebetween, a second opposite end of each of said adjustment bolts being urged into clutching engagement with said cylinder body;

a pair of drive rings one each internally threadingly engaging said second end of a corresponding one of said adjustment bolts in a fashion of a reversible screw thread connection with a backlash in an axial direction thereof, a peripheral surface of said drive rings being urged by an associated adjustment spring into clutching engagement with a partition of said cylinder body;

said pistons, adjustment bolts, adjustment springs, and drive rings are oppositely and symmetrically disposed within said cylinder bore;

a locator spring disposed between said pair of adjustment bolts;

a locator placed proximate an end of said locator spring, and a spacer placed between a top end of said locator and one of said adjustment bolts, said spacer having a supporting portion formed on a front and back surface thereof, one of said supporting portions engages with and supports said top end of the locator along an axis of said adjustment bolt, said spacer having a fluid flow passage penetrating therethrough, wherein, said supporting portions formed on an axial center of said spacer are of the identical shape both on said front and said back surfaces.

2. The brake cylinder device as is claimed in claim 1, wherein
   said top end of the locator is formed as a conical shape and said supporting portions of the spacer is formed as a tapered concave, and
   said top end of said locator is supported by and at least partially disposed within said tapered concave of said spacer.

3. The brake cylinder device as is claimed in claim 2, wherein
   an angle of said tapered concave is designed to be larger than an angle of said conical shaped top end of said locator to define a point contact therebetween.

4. The brake cylinder device as is claimed in claim 1, further comprising a second locator and a second spacer, wherein;
   said locators are positioned one each adjacent a side of said locator spring and at least partially disposed within an associated one of said adjustment bolts, said spacers being positioned one each between said locators and an associated adjustment bolt.

5. The brake cylinder device as is claimed in claim 1, wherein, front and back surfaces of said spacer are formed in the same shape.

6. The brake cylinder device as is claimed in claim 1, wherein, said spacer is integrally press-worked.

7. The brake cylinder device as is claimed in claim 1, wherein said spacer is press worked in said through hole of said one of said adjustment bolts and is substantially integrated therewith.

8. The brake cylinder device as is claimed in claim 7, wherein an outer circumferential diameter on said back and front surfaces of said spacer is smaller than an inner diameter of said through hole of adjustment bolt.

9. The brake cylinder device as is claimed in claim 1, wherein, said locator spring and said locator are integrally formed.

10. The brake cylinder device as is claimed in claim 1, wherein, said locator and top end thereof is urged by said locator spring to slide along said supporting portion of the spacer and to be aligned on said axis of said adjustment bolt.

11. The brake cylinder device as is claimed in claim 1, wherein
    said top end of the locator is formed as a tapered concave and said supporting portion of the spacer is formed as conical shape, and
    said top end of locator is supported by said spacer interengaging between said tapered concave and said conical shape.

12. The brake cylinder device as is claimed in claim 11, wherein
    an angle of said tapered concave is designed to be larger than an angle of said conical shape of the spacer to define a point contact therebetween.

* * * * *